March 12, 1968  E. M. BLACK  3,373,301
SYSTEM FOR RADIO-FREQUENCY INTERFERENCE SUPPRESSION
Filed Oct. 22, 1965
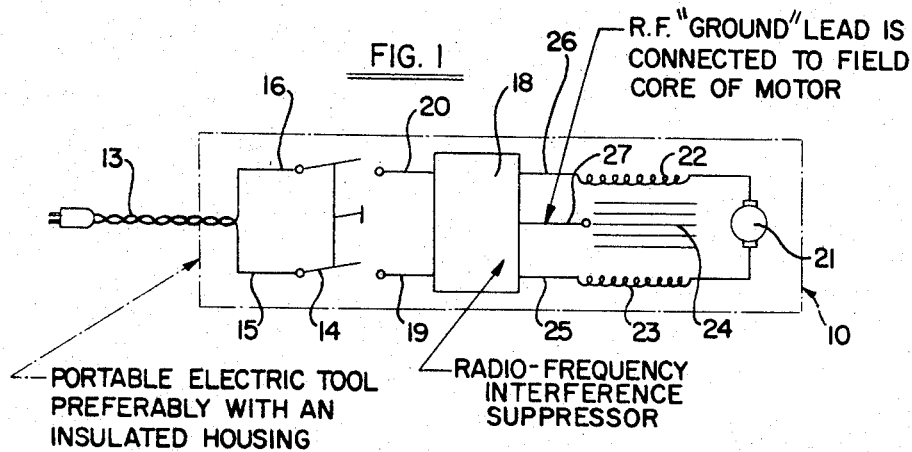
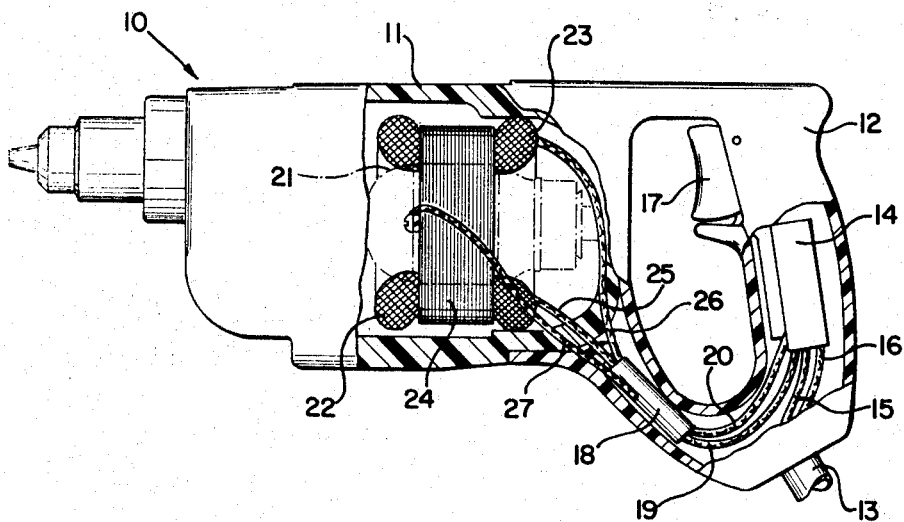
INVENTOR
ELLIOTT M. BLACK
BY *Leonard Bloom*
ATTORNEY United States Patent Office 3,373,301
Patented Mar. 12, 1968

3,373,301
SYSTEM FOR RADIO-FREQUENCY INTERFERENCE SUPPRESSION
Elliott M. Black, Baltimore, Md., assignor to The Black and Decker Manufacturing Company, Towson, Md., a corporation of Maryland
Filed Oct. 22, 1965, Ser. No. 500,952
3 Claims. (Cl. 310—72)

ABSTRACT OF THE DISCLOSURE

A portable tool is provided with an electric motor mounted within a housing which is formed, preferably, of a molded-plastic insulating material. During operation of the tool, the motor generates spurious energy in the radio-frequency spectrum. This energy may interfere with, and thus have a deleterious effect upon, the performance of radio or other electronic equipment located in the vicinity of the tool. Accordingly, a suppressor is mounted within the tool housing for the purpose of eliminating this radio-frequency interference or else minimizing it to an acceptable level. This radio-frequency interference suppressor, which is conventional and is sometimes referred to in the art as an "RFI" suppressor, is ordinarily provided with a "ground" lead. The purpose of this so-called "ground" lead is to dissipate the radio-frequency energy filtered out by the suppressor. In a conventional tool employing a metallic housing which is at ground potential, the "ground" lead of the suppressor is connected to the metallic housing. In this disclosure, however, the "ground" lead is connected directly to the field core of the motor; the field core is ungrounded electrically, yet serves to dissipate the radio-frequency energy filtered out by the suppressor.

Objects

The present invention relates to a system for radio-frequency interference suppression, and more particularly, to an improved system for the radio-frequency interference suppression of a portable electric tool, one which preferably is provided with a housing formed from a molded plastic insulating material.

It is an object of the present invention to connect the radio-frequency "ground" lead of a suppressor directly to the field core of the electric motor in the tool, thereby to dissipate the radio-frequency energy.

These and other objects of the present invention will become apparent from a reading of the following specification, taken in conjunction with the enclosed drawings, in which:

Description

FIGURE 1 is a schematic drawing of the present invention; and

FIGURE 2 is a side elevation of a typical embodiment, with parts broken away and sectioned.

With reference to the drawings, the portable electric tool 10 is preferably formed with a housing 11 of a molded plastic insulating material. The housing includes a handle portion 12, which may be of the "end handle" type (as shown) or of the familiar "pistol grip" type. A two-wire cable 13 is provided and is connected to a switch 14 by means of connectors 15 and 16. The switch, which is shown as a double-pole switch, is operated by means of a trigger 17 supported on the handle of the tool. A radio-frequency interference suppressor 18 is mounted in the tool housing and is connected to the switch by means of connectors 19 and 20. An electric motor is mounted in the tool housing. The motor comprises an armature 21 connected in series between a pair of field coils 22 and 23. The field includes a laminated field core 24 mounted in the tool housing. The suppressor 18 is connected to the motor, specifically to the field coils 22 and 23, by respective conductors 25 and 26.

The suppressor 18, the design and purpose of which are well known, has a radio-frequency ground lead 27 (sometimes referred to as the "third lead") which is connected directly to the field core 24 of the electric motor in accordance with the teachings of the present invention. In this manner, the radio-frequency energy is properly dissipated, and specially-formed shields or other metallic appendages on the tool housing are eliminated.

Obviously, many modifications may be made without departing from the basic spirit of the present invention; and accordingly, within the scope of the appended claims, the invention may be practiced other than has been specifically described herein.

I claim:

1. In a portable electric tool, the combination of a housing formed from an insulating material, a two-wire cable for the tool, the cable being adapted for connection to a suitable source of electric power, a switch mounted in the tool housing and means connecting the switch with the cable, a radio-freqeuncy interference suppressor mounted in the tool housing and means connecting the suppressor with the switch, an electric motor comprising an armature in series with a field, the field including a field core mounted in the tool housing, means connecting the suppressor with the motor, and the suppressor having a lead connected directly to the field core of the electric motor for dissipation of the radio-frequency energy filtered out by the suppressor.

2. In a portable electric tool, the combination of a housing formed from an insulating material, the housing including a portion serving as a handle for the tool, a two-wire cable for the tool, the cable being adapted for connection to a sutiable source of electric power, a switch mounted in the tool housing, the switch including a trigger mounted conjointly with the handle for energization and control of the tool, a radio-frequency interference suppressor mounted in the tool housing, an electric motor comprising an armature connected in series between a pair of field coils, the coils having a field core mounted in the tool housing, means electrically connecting the motor, switch, suppressor, and cable for operation from the source of power, and the suppressor having a lead connected directly to the field core for dissipation of the radio-frequency energy filtered out by the suppressor.

3. In a portable electric tool, the combination of a housing including a portion serving as a handle for the tool, an electric cable for the tool, the cable being adapted for connection to a suitable source of electric power, a switch mounted in the handle of the tool and including a trigger by means of which the tool may be energized, means connecting the switch with the cable, a radio-frequency interference suppressor mounted in the tool housing, means connecting the suppressor with the switch, an electric motor comprising an armature connected with a field, the field having a field core mounted in the tool housing, means connecting the suppressor with the motor, and the suppressor having a lead connected directly to the field core of the electric motor for dissipation of the radio-frequency energy filtered out by the suppressor.

References Cited

UNITED STATES PATENTS

| | | | |
|---|---|---|---|
| 2,114,102 | 4/1938 | Collins | 310—72 |
| 2,334,722 | 11/1943 | Mirick | 310—72 |
| 2,450,809 | 10/1948 | Nader | 310—72 |
| 2,843,770 | 7/1958 | Knapp | 310—72 |
| 3,121,813 | 2/1964 | Pratt | 310—50 |
| 3,119,942 | 1/1964 | Luther | 310—50 |
| 3,206,627 | 8/1965 | Marek | 310—50 |

MILTON O. HIRSHFIELD, *Primary Examiner.*

J. D. MILLER, *Examiner.*